United States Patent [19]

Zimbardi et al.

[11] Patent Number: 5,054,669
[45] Date of Patent: Oct. 8, 1991

[54] PORTABLE LURE CONTAINER

[76] Inventors: D. John Zimbardi, 122 Thompson Ave., Little Valley, N.Y. 14755; Wayne H. Matthies, 10 S. Franklin St., Cattaraugus, N.Y. 14719

[21] Appl. No.: 552,175

[22] Filed: Jul. 12, 1990

[51] Int. Cl.⁵ .................. B60R 9/00; A01K 97/00
[52] U.S. Cl. .......................... 224/42.45 R; 224/920; 224/42.46 R; 42/57.1; 42/54.1; 190/118
[58] Field of Search ......... 224/920, 42.45 R, 42.46 R, 224/103, 269; 43/57.1, 54.1; 206/315.11, 315.1, 372, 373, 561; 220/94 R, 94 B, 96, 4.21, 4.22, 4.24; 190/115-119

[56] References Cited

U.S. PATENT DOCUMENTS

| | | | |
|---|---|---|---|
| 2,316,833 | 4/1943 | Baron | 43/57.1 |
| 2,513,538 | 7/1950 | Williams | 224/245 |
| 2,608,459 | 8/1952 | Malmquist | 312/200 |
| 2,941,637 | 6/1960 | Silverman | 190/118 |
| 3,113,817 | 12/1963 | Imel | 43/54.1 |
| 3,948,579 | 4/1976 | Schirmer | 312/111 |
| 4,765,470 | 8/1988 | Curci | 224/920 |
| 4,770,327 | 9/1988 | Fortson | 224/42.01 |
| 4,852,293 | 8/1989 | Levine et al. | 190/118 |
| 4,890,414 | 1/1990 | Bridenthal et al. | 43/54.1 |
| 4,972,625 | 11/1990 | Barnes | 43/57.1 |

Primary Examiner—Henry J. Recla
Assistant Examiner—Keith Kupferschmid
Attorney, Agent, or Firm—James J. Ralabate

[57] ABSTRACT

The lure container comprises adjustable shelves that can be configured to any size lure chamber. The units of the lure container have a glass or other transparent cover so that the appropriate lure can be predetermined before removing from the container. An important feature of this invention is the dual purpose adjustable handle which can be used both as a handle to carry the container and as an attachment which connects the lure container to the side of a boat. This dual purpose adjustable handle is made up of two complementary pieces or parts which when fitted together constitute either the handle or the boat attachment means.

14 Claims, 3 Drawing Sheets

PORTABLE LURE CONTAINER

This invention relates to a housing for fishing lures and, more specifically, to a novel portable lure container. This application is a continuation-in-part of parent application Ser. No. 07/409,019 filed in the U.S. Patent and Trademark Office Sept. 18, 1989.

BACKGROUND OF THE INVENTION

It is known to provide various containers for housing fishing lures and the like. Some of these containers provide boat attachment means and others provide compartments into which unit lures may be stored. Typical prior art lure containers are disclosed in U.S. Pat. Nos. 2,316,833; 2,513,538; 2,603,549; 4,765,470 and 4,770,327.

In U.S. Pat. No. 2,316,833 (Baron) a tackle box is described having fixed loops or hanging members for securing the tackle box to the side of a boat. These loops are of one dimension and cannot be used on all size boats. In addition, these loops would have a tendency to slide along the rim of the boat sides upon any up and down motion of the boat. Also, the tackle box of Baron's can easily become disengaged because of the movable nature of these securing loops. The shelves in Baron are of fixed sizes and cannot be adjusted if needed to house various size lures. The lures in Baron's device are suspended by their hook portions on horizontally-disposed rods which could dull the hooks because of constant movement thereon. The closure means or doors of Baron are outside his box when the tackle box is in use and could be an obstruction in the limited confines of a boat. Also, the lures are exposed when Baron's doors are open creating the potential for these lures to become entangled with the lure in use when the line is swung within the boat. Thus, while Baron's tackle box has a multi-lure capacity, it has important practical drawbacks when used.

In Williams U.S. Pat. No. 2,513,538 a carrier for lures is disclosed which has a spring-loaded boat attachment means. This attachment means comprises a bar fixed to both ends of the container and adapted to be attached to the rail or edge of a boat. Because Williams' boat attachment is fixed it has limited use; for example, it does not allow the user to raise or lower the lure container in relation to the depth of the boat. Also, Williams' container has a very limited capacity and can only house from one to ten lures. Considering the space requirements for this type lure container, few lures can be contained therein. Since each lure compartment of Williams has a separate door only one lure can be viewed and removed at one time. The doors of Williams open to drop the lures into the user's hand which can be dangerous. A container where all the lures can be viewed and the desired lure lifted off the support would provide a significant advance in the art.

In U.S. Pat. No. 2,603,549 to Tessmer a tackle box with a revolving lure receptacle is disclosed. Tessmer provides compartment enclosures that are transparent through which the lures can be viewed. However, since the receptacle is rotatable, only four compartments are viewable at one time while the other compartments are hidden from view in the lower portion of the housing. Also, containers of the type disclosed by Tessmer have a limited capacity and can only house lures of a limited size. The compartments of Tessmer are of one dimension and are not adjustable to suit various size lures.

In U.S. Pat. No. 4,765,470 to Curci a lure container having movable drawers is described. These drawers of Curci are all tyhe same size and are interchangeable and cannot accommodate both large and small lures. His container is designed to be worn by a fisherman while fishing and is intended to house lightweight equipment and lures. It is for the stream fisherman wherein small artificial flies and small lures are used. Again, Curci's container is of limited capacity, can only accommodate small lures, has no boat connection means nor are its compartments adjustable.

The Fortson U.S. Pat. No. 4,770,327 discloses a portable tackle box having a multiplicity of interchangeable inserts for holding fishing lures. Since Fortson's container is designed to be worn it also has a limited capacity. There is no protective covering for the lures once the container of Fortson is opened. Thus, with the lures exposed they can become entangled with the line and lure being used or can easily become dislodged. The boat attachment means of Fortson requires the use of tools and screws which could be impractical, especially if the boat is a rented or borrowed boat. A container with non-destructive means of attachment to a boat would be substantially superior and versatile to the type disclosed by Fortson.

SUMMARY OF THE INVENTION

It is therefore an object of this invention to provide a novel lure container devoid of the above noted disadvantages.

Another object of this invention is to provide a novel lure container having a handle means that also is used as attachment means to the side of a boat or the like.

Still another object of this invention is to provide a lure container that can accommodate and house most any size lure.

Another still further object of this invention is to provide a lure container that can be attached to most any size boat side.

A further object of this invention is to provide a lure container that allows easy visual location and convenient removal of desired lures.

A yet further object of this invention is to provide a multicompartment lure container that has a conveniently adjustable attachment-handle means for adjusting to any size boat side.

A still yet further object of this invention is to provide a lure container whereby all of the lures are visible at one time.

Another object of this invention is to provide a lure container wherein the two-piece handle means has a dual function including a boat attachment means.

Yet another object of this invention is to provice a two-piece attachment means wherein each can be used independently on boat sides of different thicknesses or on sides at right angles such as a corner.

Still another object of this invention is to provide a novel lure container that is practical and easy to use, convenient to manufacture, and relatively inexpensive.

These and other objects of this invention are accomplished in accordance with this invention by providing a fishing lure container having adjustable compartments to accommodate various size lures. It comprises vertical and adjustable horizontal shelves that will fit into various slots or other means depending upon the size compartment desired. A critical feature of this invention is the adjustable handle means which has the dual function of a handle means and a boat attachment means. At one end of the container or handle are located knobs which when turned will loosen or tighten the handle in place. These knobs are positioned through a slot through which the handle can be adjusted to accommodate the thickness of the boat side to be attached to. The handle has an L-shaped configuration so that when used as a handle it can be securely locked in place holding the two piece housing unit in place. The two housing units are preferably attached by a hinge means so that they can be closed upon themselves with the lure compartment openings facing each other in the inside of the closure. Transparent doors are used in each unit at the face of the compartment openings. Any suitable transparent cover may be used provided it does not obstruct the freedom of motion of the user.

The L-shaped handle means comprises a horizontal portion or face and a vertical portion or face that is positioned at a terminal portion of the handle means at substantially right angles to the horizontal portion. One or preferably two (or more) L-shaped handle means may be used on the lure container of this invention. The use of two L-shaped handle means will be described however throughout for the sake of clarity. The handle means therefore has located at a first terminal end (opposite end from the location of the vertical face) elongated slots through which screwed bolts are disposed. Upon loosening these bolts, the handle means can be moved to the desired thickness (of a boat side for example) and then tightened to lock the lure container to the boat side or gunnel. The length of the slots can vary depending upon the latitude of adjustability desired. The slots and adjustable bolts are preferably located in the handle means on the top of the lure container opposite to the hinged sides. This is extremely important to the invention. If they were located on the top of the lure container closest to the hinged sides, it would provide only attachment support for the center portion of the lure container when attached to a boat. This would not afford maximum attachment support; see FIG. 2 for location of handle support connection means (bolts) and slots when lure container is opened.

Any suitable transparent cover may be used over the open ends of the lure compartments in the lure container. In a two unit device, two transparent doors would be used. It is desirable that after the selected lure has been removed, the cover be returned to its cover position so that lures do not become dangerous to the user and their hooks are not vulnerable to become entangled in the hooks or line being used by the fisherman. The container housing may be constructed of plastic, fiberglass or any other strong but lightweight material.

There are several critical features of the present invention, i.e. that must be present in the device disclosed and claimed herewith. A first critical feature of the present invention is the adjustable shelving that is used to make up the compartments for storing the lures. The vertical partitions used in the housing units have slots along their peripheral portions into which the horizontal partitions can slide and be maintained in a secure fashion. In other words, after the horizontal shelf or partition is put in position, it stays extremely secure in position and is difficult to dislodge. In this way the user can custom make his container to suit the size and shapes of his own particular lures. In other words, he is not stuck with a container having predetermined size compartments which may be too small or too long for his particular lures. These horizontal partitions have an aperture therethrough from which the lure hooks are suspended or hung. The see-through cover provides not only viewing means for the compartments but also acts as a means to prevent side to side movement of the lures. Since the compartments have three closed sides, the transparent cover acts as the fourth side to completely contain and prevent substantial movement or dislodging of the lures. If desired, the vertical partition can be left without horizontal shelves or partitions in the event a very long lure is to be housed therein. The top portion of the container units have apertures therein for hanging lures in the uppermost compartments. The apertured adjustable shelving together with a transparent lure cover allow the fisherman to use one hand to easily remove a lure from the container while holding his line or other items in the other.

Another critical feature of this invention is the adjustable L-shaped handle means having a horizontal and vertical face that is also used as a means to connect the lure container to a boat edge or chair edge or the like. The adjustable handle can be used to connect the lure container of this invention to any other substantially vertical foundation. The handle means is an inverted L-shaped structure (or two) having a handle grip on its upper horizontal face and a slot (or slots) extending through its thickness at a first terminal end of said handle means. A threaded bolt fits through each slot to tighten or loosen the handle means when the handle means is used to carry the lure container or when it is used as an attachment means to the side of a boat. On the second terminal end of said handle means is the downwardly projected vertical face (which with the horizontal face make up the L-shaped configuration of the handle means), which fits snugly around an upper corner of the container to assist in locking and supporting the two housing units together. When the handle means is used as an attachment means to a boat this vertical face fits on the outside surface of the boat side and locks the lure container to the boat. When the L-shaped handle means is to be used as a boat connector, the bolts are merely loosened, the handle means adjusted and moved so that the vertical face now abuts the outside of the boat. Its vertical face is then fixed to a back side of the boat and the horizontal face of the handle means adjusted on the upper horizontal face of the container and tightened thereon. The outside portion of each container when in a closed position has slots or keyholes into which metal projections extending outwardly from the vertical face of the boat side will fit in the event the container is to be raised or lowered. These slots can fit around a screw or other projections in the boat side. Since there can be a number of vertically aligned slots in the outside portion of the container units, the lure container can be raised or lowered depending upon the depth of the boat or boat side structure. This means for raising or lowering the lure container is important to this invention since it will accommodate use in shallow boats. The L-shaped handle attachment means having slots therein can be adjusted or moved forward or backward by the threaded bolts to accommodate various width boat sides. This invention will be described throughout as having a two part handle means (as shown in all the figures); however, a one or more part handle means may be used conditioned upon it or their having the slot tightening means and L-shaped configuration described throughout this disclosure. The keyhole slots in the outside portions of the containers provide up and down adjustment of the container, thus the lure container of this invention can be equally conveniently used on most boats of various depths. The versatility of the lure container of this invention is evidenced by its adjustable boat side handle connecting means, by its vertical positioning means (to accommodate depth), by its adjustable shelving to accommodate various size lures and by its large storage capacity. Add to these advantages the clear see-through lure cover that is used and the desirability of the novel lure container disclosed herein is obvious. The container of this invention is also substantially self-supporting in the event it is desired to stand it up (or laid back on an angle as shown in FIG. 6) upon a flat horizontal surface. Other desirable features may be used in the present lure container such as:

(1) magnetic strips in the inside wall of each compartment to assist in holding the lures in position, (2) a bottom compartment that extends throughout the width of the container for storage of tools and the like, (3) outside attachment means or tool holders to secure pliers, flashlights or other accessories to the exterior of the container units, (4) other accessories may be used with the container of this invention:
 (a) for lifting or lowering the lure container relative to the floor of a boat;
 (b) to extend (or alter) the boat attachment means to accommodate various widths of boat sides;
 (c) to enable the boat attachment means to be used for attachment or for being secured to round or other unusual boat surfaces including non-symetrical sides, uneven sides, etc.
 (d) or any other accessory that will enhance, modify or adjust the container of this invention.

Use of all of the above 1-4 are within the scope of this invention.

BRIEF DESCRIPTION OF THE DRAWING

FIG. 4 is a top side perspective view showing the lure container of this invention when attached to the side of a boat or the like.

DESCRIPTION OF THE DRAWING AND PREFERRED EMBODIMENTS

Figure 1:
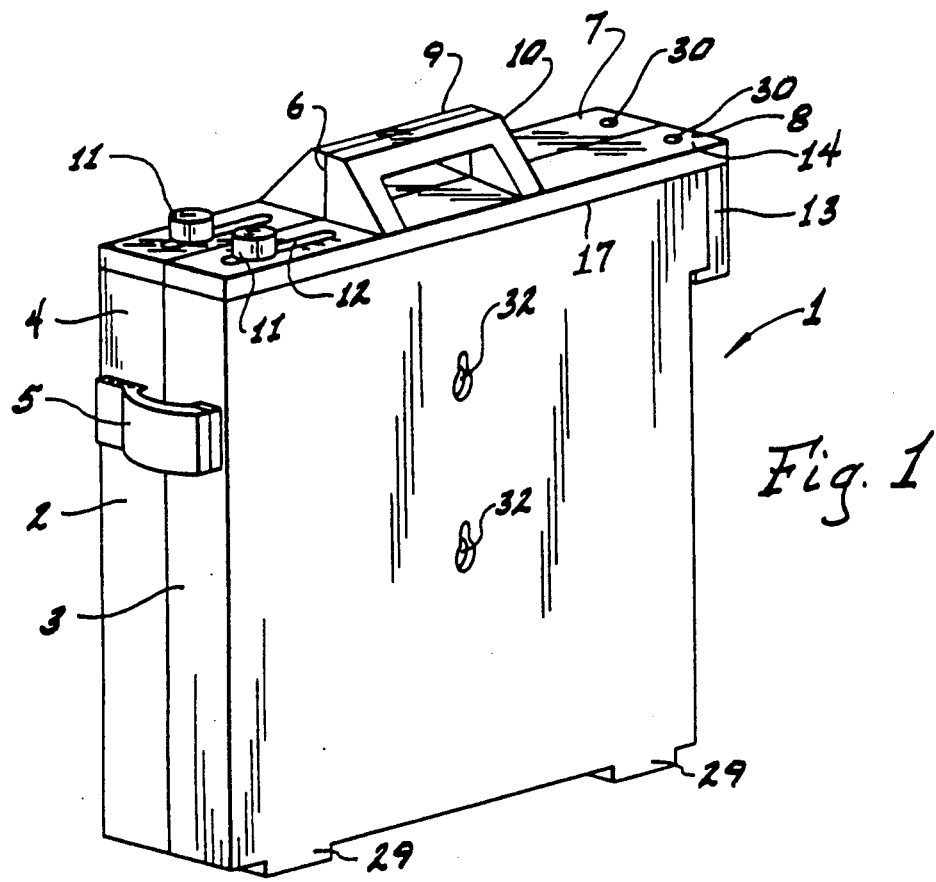
FIG. 1 is a side perspective view of the lure container of this invention in a closed position.
Figure 2:
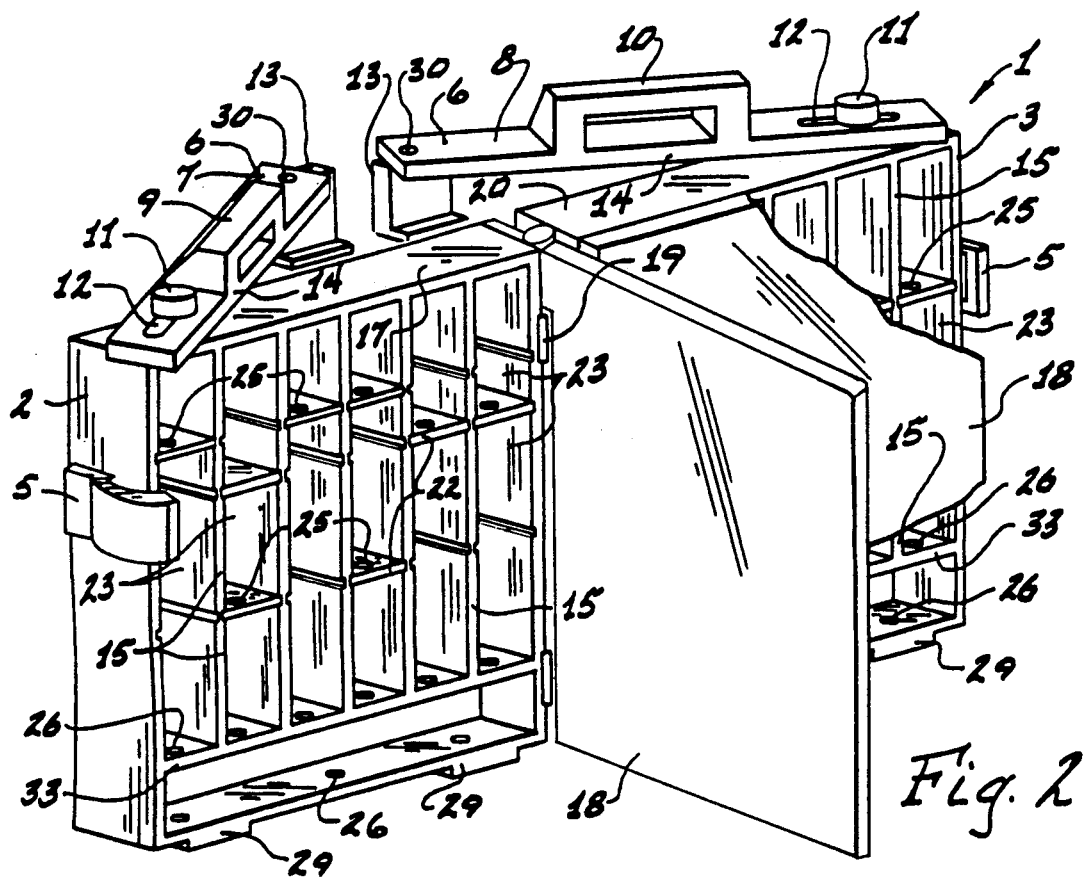
FIG. 2 is a top front perspective view of the lure container of this invention in an open position.
Figure 4:
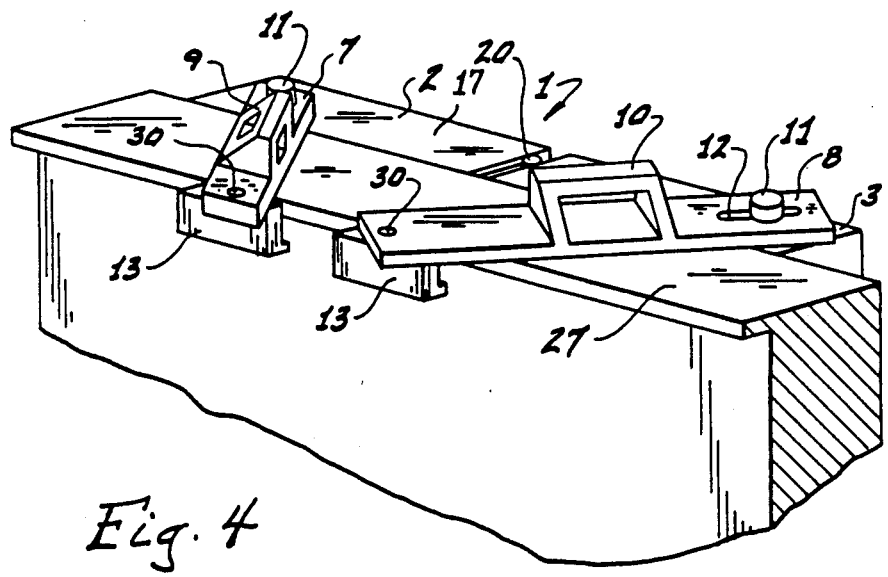
Figure 5:
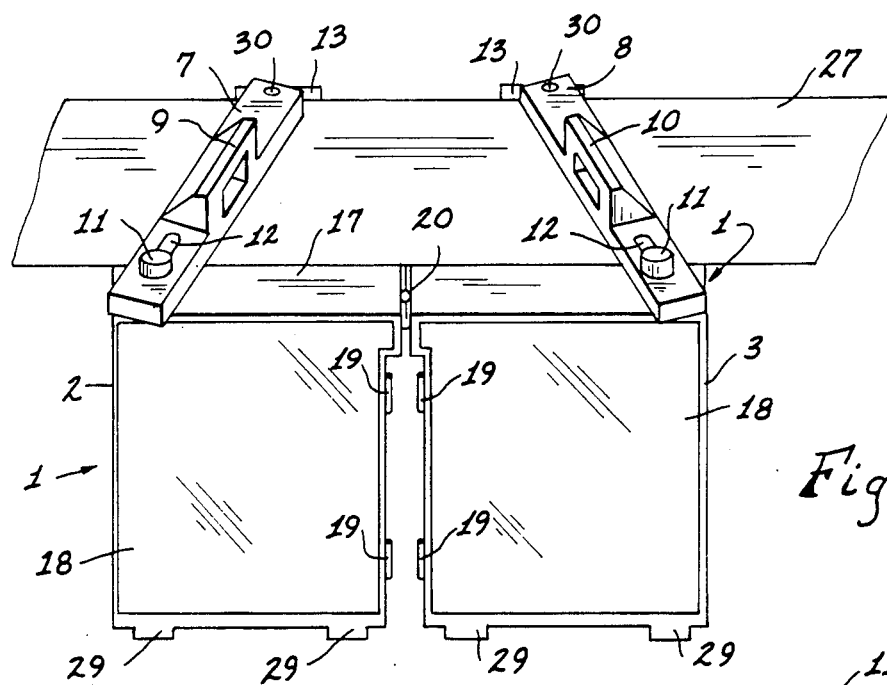
FIG. 5 is a top front expanded perspective view showing the lure container.

In FIGS. 1 and 2, lure container 1 comprises two units 2 and 3 connected together by a hinge or other suitable connecting means. On a first side end portion 4 of the container 1 are locking means 5 such as a clamp, snap lock or other closures to assist in keeping units 2 and 3 together. The main connecting means maintaining units 2 and 3 together is dual purpose handle means 6 which comprises a two part complementary handle means comprising parts 7 and 8. These parts 7 and 8 have mating hand grips 9 and 10 which form the hand grip for the container 1. The dual purpose handle means 6 has at one of its terminal end portions a tightening means 11 cap or knob with a thread bolt which is movably extended through slots 12 and screwed into the tops of units 2 and 3 or alternatively the bolts can be stationary and tightening means 11 cap may be movable. On the opposite terminal end of handle means 6 is a vertically disposed face or extension 13 integral with and at right angles to the horizontal face 14. To lock units 2 and 3 together, tightening means 11 or cap are tightened by screwing them downwardly through slots 12 until they tightly hold handle means 6 against the upper side 17 of the container 1. Vertical face 13 on each part 7 and 8 wraps around the upper corners of units 2 and 3 and locks them together. Locking means 5 may be housed on the opposite end of container 1 to additionally ensure secure locking. When in a closed position as shown in FIG. 1, the vertical face 13 is on the same side of container 1 as is the hinged portion. Therefore the tightening means 11 and slots 12 are on the same side of container as is the unhinged portions of units 2 and 3. The L-shaped handle means 6 thus is made up of horizontal face 14 and vertical face 13 integral therewith connected by swivel pin 30. Swivel pin 30 permits vertical face 13 to fit at any angle on a boat side as shown in FIGS. 4 and 5. It is important to this invention that vertical face 13 be movable in order to accommodate any type boat side. If vertical face 13 was fixed at a 90° angle with horizontal face 14 it could only be used on limited side thicknesses. With swivelling vertical face 13, even relatively thin boat sides can be used angle with horizontal face 14 it could only be used on limited side thicknesses. With swivelling vertical face 13, even relatively thin boat sides can be used for container 1 to be attached to. Keyholes 32 are positioned in the outside of each unit 2 and 3. When it is time to open container 1, locking means 5 is unlatched, and tightening means 11 are loosened so that parts 7 and 8 will freely move back and forth along slots 12. Unit 2 and 3 are then freely opened as shown in FIG. 2 exposing lure compartments 23 in their inner face. A transparent door 18 (one on each side of unit 2 and 3) covers the open end portions of compartments 15 to prevent the lures from swinging out and entangling. Handle means 6 when loosened by tightening means 11 can freely swing outwardly and longitudinally because of slots 12 being guided by tightening means 11 as parts 7 and 8 are either extended outwardly to accommodate a thicker boat side or pushed inwardly (toward hand grips 9 and 10) to accommodate a thinner boat side. Units 2 and 3 are connected by a hinge means 20 which movably holds them together. Feet 29 hold the container 1 above the ground so water can drain out easily from slots or holes 26.

Figure 3:
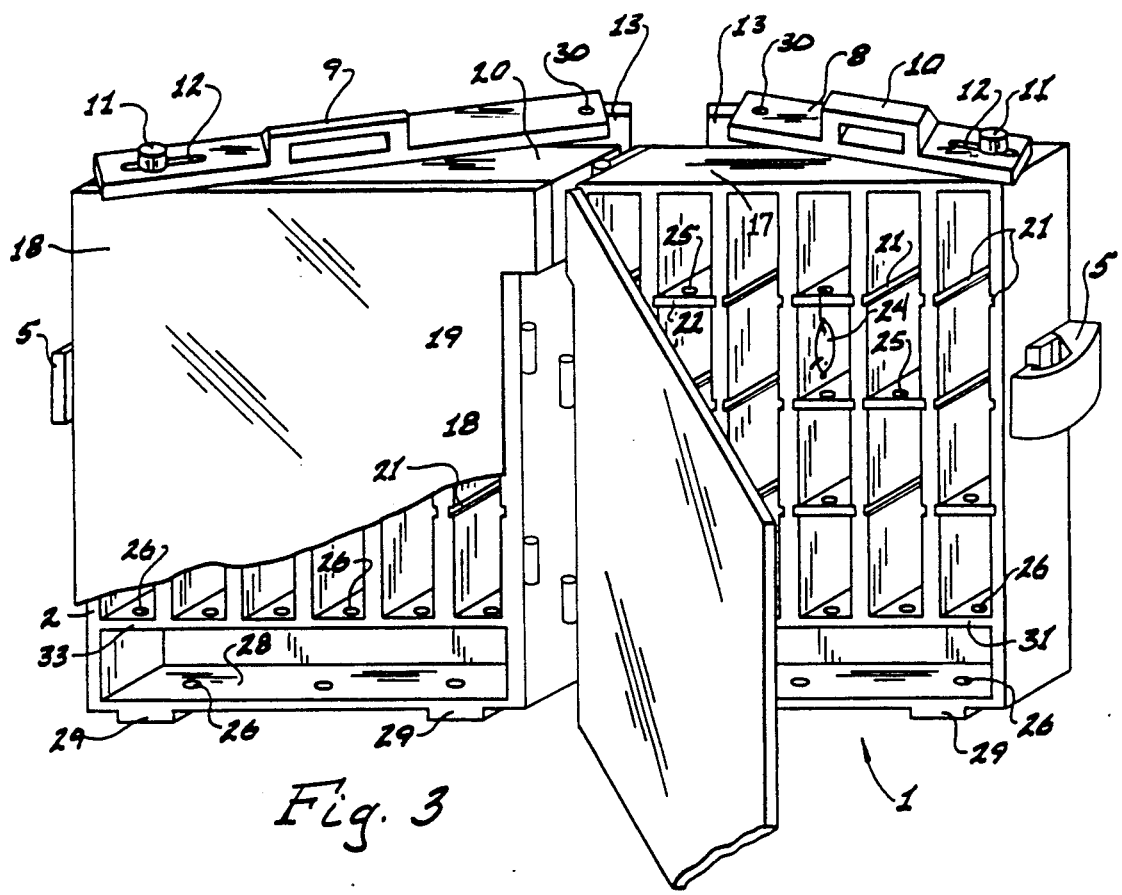
FIG. 3 is a front perspective view of the lure container of this invention when opened and showing the specifics of the adjustable horizontal partitions and compartments formed thereby.

When completely opened, the container appears as shown in FIG. 3. The lure container or housing 1 of this invention as noted comprises two unit housings 2 and 3. Each unit housing 2 and 3 is identical to the other except for the hinge 19. Hinges 19 may be used for doors and to connect units 2 and 3. Each unit housing 2 and 3 contains a plurality of vertical partitions 15 which are vertically positioned in a parallel fashion within each box-like housing unit 2 or 3. These vertical partitions have several slots or grooves 21 along their length to accommodate and receive horizontal partitions 22 to form thereby compartments 23 for housing lures 24.

There are apertures 25 in partitions 22 from which the lures are suspended by their hooks so they will not become disengaged when moved. Each partition 22 will have a specific countersunk aperture to hold each suspended lure securely in each compartment 23. Wet lures will drip moisture, which will then be dissipated through holes 28 shelf 33 and floor 26 and out the bottom of the container. Since they are suspended they will evaporate moisture or drip-dry water which will escape through holes or slots 26 in the floor. Since there are several slots 21 along the length of vertical partitions 15, various size compartments can be formed by inserting horizontal partitions 22 at the desired position or positions. Any suitable means may be used but these means must provide for the formation of various size compartments. If a large compartment is desired to house a larger lure, the horizontal partition 22 is placed in lower slots 21 of vertical partitions 15. Conversely, if a smaller or shorter compartment 23 is desired, the horizontal partition 22 is placed higher up closer to the top or handle means 6 of the lure container 1. Handle means 6 has an inverted L-shape construction (see FIG. 1) and is used to fix and stabilize sections 2 and 3 together when the lure container 1 is closed. In FIGS. 2 and 3 optically clear sliding or hinged glass doors 18 are shown closing off the open front of each section 2 and 3 and minimize entanglement of any item with the lures therein. These glass doors 18 are clear so that the lures can be viewed therethrough. Any suitable closure 18 may be used providing it's transparent and does not overhang and take up valuable boat space or interfere with the user's mobility. In the embodiment of FIG. 3 drain holes 26 are located at the bottom layer of units 2 and 3 to permit drainage of water or other liquids out of container 1.

In FIGS. 4 and 5, the lure container 1 is shown as it would be when attached to the side 27 of a boat or the like. The container 1 is opened as shown in FIG. 3 and the L-shaped handle means parts 7 and 8 are adjusted by pushing or pulling them along slots 12 to obtain the desired length. Once the desired length is obtained, the parts 7 and 8 are tightened in place by screwing down tightening means 11. The container 1 is now securely attached to the boat side 27. It is preferable for many reasons that parts 7 and 8 be movably and permanently attached to container 1. Removable parts could get lost or be easily damaged. Also it is much easier to merely swing parts 7 and 8 in position when attaching to a boat side 27 or when securing units 2 and 3 together to form the handle means 6. A bottom tray 28 may be used to keep items such as fishing accessories, if desired.

Figure 6:
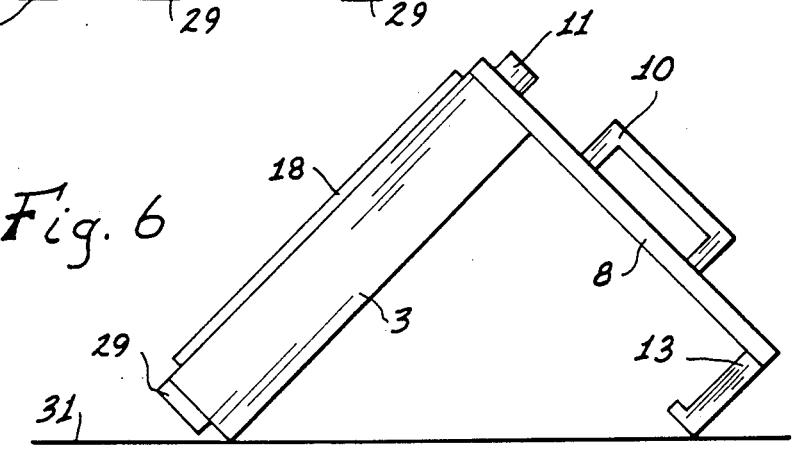
FIG. 6 is a side perspective view of the lure container of this invention whrein the handle means are used as leg-supports when the container is used on a flat or uneven surface.

FIG. 6 shows how container 1 may be used on a flat surface 31 or on a dock using handle parts 7 and 8 as leg supports (since this is a plan view only part 8 is shown). Transparent glass door 18 is merely opened to gain access to the desired lure. Tightening means 11 is first loosened to adjust the part 8 (and part 7) to the desired leg length by moving along slot 12. Once the proper leg length is obtained, tightening means 11 is tightened to fix leg or part 8 (and 7) in place. Each unit 2 and 3 can be even used to connect to sides or supports of different thicknesses by the use of parts 7 and 8. Also, if the container 1 is used in a corner of a boat each part 2 and 3 can fit and connect to sides at right angles.

Figure 7:
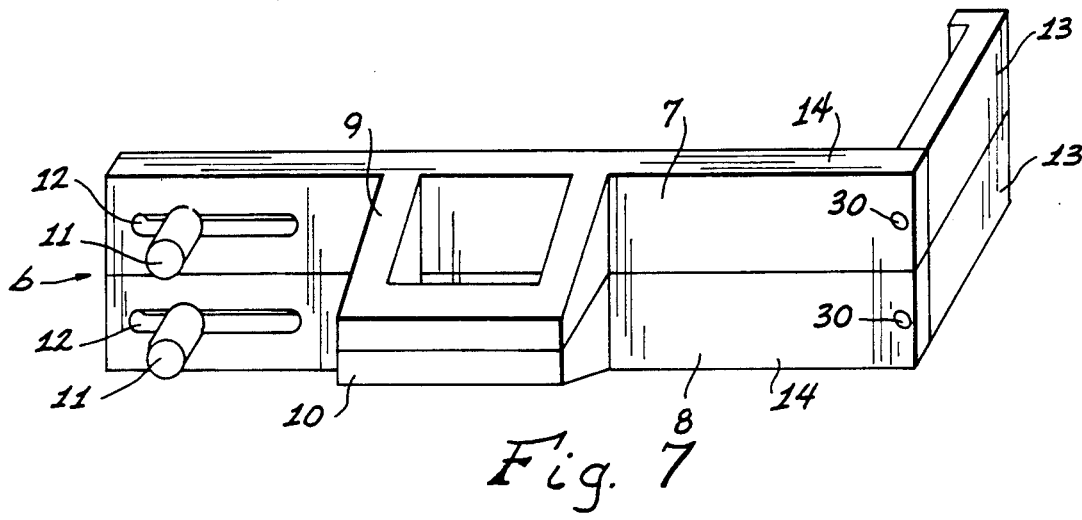
FIG. 7 is a top perspective view of the dual purpose handle means used in the present invention.

FIG. 7 shows an enlarged view of the two piece handle means 6 made up of parts 7 and 8. The parts 7 and 8 have horizontal face 14 and a vertical face 13 which makes up the L-shape configuration. At one terminal portion of each of parts 7 and 8 are slots 12 through which tightening bolts 11 are disposed. The slots 12 can be of any convenient length depending upon the width of the boat side to be attached to. To adjust the length of parts 7 and 8, the user merely slides along slots 12 until the desired length is reached and then tightening means 11 are tightened to fix parts 7 and 8 in place. The solid lines show handle means 6 when connected together when used as a handle to carry the secured container 1 from one place to another. The parts 7 and 8 are freely movable at angles of up to 360° from their original position (as shown by solid lines). Once parts 7 and 8 are placed at the correct length and angle, tightening means 11 are used to tighten them in place on a boat side as shown in FIGS. 4 and 5.

The preferred and optimumly preferred embodiments of the present invention have been described herein and shown in the accompanying drawing to illustrate the underlying principles of the invention, but it is to be understood that numerous modifications and ramifications may be made without departing from the spirit and scope of this invention

What is claimed is:

1. A lure container comprising a housing, a series of vertical partitions, a plurality of horizontal partitions, an adjustable dual purpose handle means and a substantially transparent closure means, said housing containing said vertical partitions each disposed substantially parallel to each other, said vertical partitions having means therein to receive said horizontal partitions to form with said housing independent compartments thereby, said transparent closure means positioned over open portions of said compartments, said adjustable dual purpose handle means having means for the user to carry said lure container and having adjustable means for securing said container to the side of a boat or the like, said adjustable dual purpose handle means has an L-shaped structure having a horizontal face and a vertical face, said horizontal face having a handle grip and at least two elongated slots, said handle means adjustable along the elongation of said slots.

2. The lure container of claim 1 wherein said transparent closure means are transparent glass or plastic doors.

3. The lure container of claim 1 wherein said transparent closure means is a flexible plastic sheet.

4. The lure container of claim 1 wherein said adjustable dual purpose handle means is a two-part structure each having an L-shaped configuration with a horizontal face and a vertical face, said horizontal face having tightening means extending upwardly therefrom for adjusting said adjustable dual purpose handle means when said lure container is to be attached to a boat side.

5. The lure container of claim 1 wherein said housing has a plurality of apertures in said horizontal partitions from which lures may be suspended and hung.

6. The lure container of claim 1 wherein said adjustable dual purpose handle means is movably attached to said housing at the top of said housing, and wherein said handle means extends as a horizontal face to at least a portion of said top of said housing and extends as a vertical face down at least a portion of a side of said housing.

7. The lure container of claim 1 wherein said means to receive said horizontal partitions are slots located throughout substantially the length of said vertical partitions.

8. A lure container comprising a housing, a series of vertical partitions, a plurality of horizontal partitions, an adjustable dual purpose handle means and a substantially transparent closure means, said housing containing said vertical partitions each disposed substantially parallel to each other, said vertical partitions having a plurality of grooves therein to receive said horizontal partitions to form with said housing independent compartments thereby, said transparent closure means positioned over open portions of said compartments, said adjustable dual purpose handle comprising two complementary parts each having integral therewith hand grip means for the user to carry said lure container and comprising adjusting means for securing said container to the side of a boat or the like, said two complementary arts each having an L-shaped configuration with a horizontal face and a swivelling vertical face, said horizontal face of each part having a handle grip and at least one slot, said slots adapted to receive bolts therein when adjusting and locking the position of said adjustable dual purpose means and connecting said lure container to a side of a boat.

9. The lure container of claim 8 wherein said grooves to receive said horizontal partitions are located throughout substantially the length of said vertical partitions.

10. The lure container of claim 8 wherein said adjustable dual purpose handle means comprises said two complementary parts each having an L-shpaed configuration with an upper or horizontal face and a side or swivelling vertical face, each of said upper and side faces being coextensive with each other, said upper face having at one end thereof slots through which the position of said dual purpose handle means are adjusted.

11. The lure container of claim 8 wherein said adjusting means comprises elongated slots in each of said parts and a tightening means disposed through each of said elongated slots, the position of said adjustable dual purpose handle means being adjustable to a distance corresponding to the length of said elongated slots.

12. The lure container of claim 8 whrein each of said horizontal partitions has an aperture therein from which lures or the like may be suspended.

13. The lure container of claim 8 wherein said adjustable dual purpose handle means comprises said two complementary parts each having an L-shaped construction with tightening means movably connected thereto and attached to said housing at a top of said housing, and wherein said adjustable dual purpose handle means by its L-shaped construction fits at a corner of a portion of said top of said housing and extends down at least a portion of a side of said housing.

14. The lure container of claim 8 wherein said adjustable dual purpose handle means comprises two parts each having an L-shaped construction with tightening means movably connected thereto and attached to said housing at a top of said housing, and wherein said adjustable dual purpose handle means by its L-shaped construction fits at a corner of a portion of said top of said housing and extends down at least a portion of a side of said housing.

* * * * *